Jan. 4, 1966 W. D. MULLINS ETAL 3,226,981
CONDITION RESPONSIVE SIGNAL GENERATOR FOR PRODUCING
A VARIABLE FREQUENCY SIGNAL
Filed Oct. 29, 1962 3 Sheets-Sheet 1

INVENTORS
WILLIAN D. MULLINS
DOYLE E. WILCOX
ROY H. MATTSON
BY
*Sidney Magnes*
AGENT Jan. 4, 1966   W. D. MULLINS ETAL   3,226,981
CONDITION RESPONSIVE SIGNAL GENERATOR FOR PRODUCING
A VARIABLE FREQUENCY SIGNAL
Filed Oct. 29, 1962   3 Sheets-Sheet 2

INVENTORS
WILLIAM D. MULLINS
BY DOYLE E. WILCOX
ROY H. MATTSON

*Sidney Magnes*
AGENT

United States Patent Office 3,226,981
Patented Jan. 4, 1966

3,226,981
CONDITION RESPONSIVE SIGNAL GENERATOR FOR PRODUCING A VARIABLE FREQUENCY SIGNAL
William D. Mullins, La Habra, and Doyle E. Wilcox, La Puente, Calif., and Roy H. Matison, Minneapolis, Minn., assignors to North American Aviation, Inc.
Filed Oct. 29, 1962, Ser. No. 233,724
15 Claims. (Cl. 73—517)

The instant invention relates to electronic circuitry for producing a signal; and more particularly to electronic circuitry that produces an output signal whose frequency changes in accordance with changed conditions.

Background

In many cases, it is desirable to know how the spacing between selected elements changes under varying conditions. The varying conditions could be, for example, the bending of a beam under load, the relative movement of two elements as they are strained, or the accelerations of a vehicle.

Various sensing devices may be used, but for illustration only, the invention will be described in terms of vehicle acceleration, although as indicated above, this is not to be construed as a limitation of the use of the invention.

One way to measure extremely slight differences in spacing is to let the elements form part of an electrical "capacitor." In this usage, very slight differences in the spacing will cause a difference in the electrical "capacitance," which can then be included as part of an electronic circuit that either measures the capacitance, or produces different effects that depend upon the instantaneous value of the capacitance.

In the past, the use of these varying capacitances have had inherent difficulties when a linear-input-to-output relationship is required. In one case the output signal varied as the square-root of the capacitance; and in another case a plurality of electrically-isolated, but mechanically-interlinked "ganged" capacitors were required. Each of the above circuits had an undesirable characteristic; since (1) it is frequently desirable that the output signal vary directly with the change of capacitance, rather than as the square root, and (2) it is undesirable to have mechanically coupled capacitors.

Objects and drawings

It is therefore the principal object of the invention to provide an improved signal generator.

The attainment of this object and others will be realized from the following specification, taken in conjunction with the drawing of which:

Description of the invention

Figure 1:
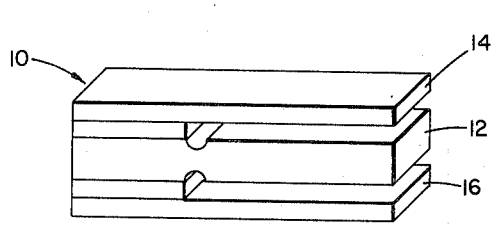
FIGURE 1 is a schematic representation of one form of an accelerometer in its normal state.

FIGURE 1 shows an exemplar accelerometer 10 having a so-called "capacitive pickup." A reed 12 is mounted so that one end is free to move between an upper plate 14 and a lower plate 16. The entire reed 12, or—alternatively—the upper and lower surfaces thereof, is electrically conductive; and at least the surfaces of plates 14 and 16 that are adjacent to reed 12 are also electrically conductive. In this way the adjacent electrically-conductive surfaces form electrical capacitors, whose values are determined primarily by the area of the adjacent surfaces and the distance between them.

In the absence of acceleration, accelerometer 10 assumes the quiescent state shown in FIGURE 1, wherein reed 12 is spaced substantially equally from the upper and lower plates 14 and 16.

Figure 2:
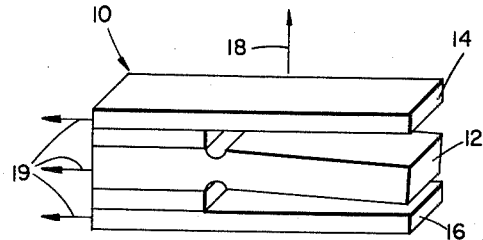
FIGURE 2 is a schematic representation of the same accelerometer in its stressed state.

The operating state of the accelerometer is shown in FIGURE 2, it having been assumed that acceleration has taken place upwardly, as shown by arrow 18. The acceleration has caused reed 12 to bend downward, so that it is closer to lower plate 16, and is farther from upper plate 14. As may be understood, the change in spacing between the reed and the plates has varied the capacitance of the electrical capacitor formed by these surfaces; increasing one, and decreasing the other. Lead wires 19 permit the variable capacitance to be incorporated into an electronic circuit.

It is now desirable to convert these changed capacitance values to an electrical output signal that varies directly with the changed spacing, and thus with the acceleration.

Figure 3:
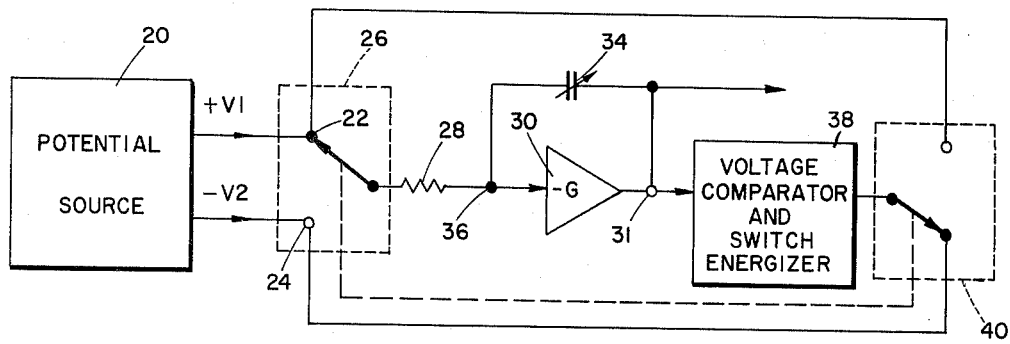
FIGURE 3 is a schematic circuit of the invention.

FIGURE 3 shows a circuit for accomplishing the desired result. A potential source 20 is capable of providing two different values of potential, V1 and V2. These reference voltages may have any desired values which are substantially constant with time, but are most conveniently available as a plus voltage and a minus voltage obtained from the same voltage source. The two voltages are applied to respective input terminals 22 and 24, which are connected to a single-pole double-throw input switch 26 or its equivalent.

When input switch 26 is in the upward position shown, the positive potential is applied through a summing resistance 28 to an amplifier 30 that has a large amplification, and whose output signal at output terminal 31 varies progressively in the direction opposite to the input signal, as indicated by —G. In the case illustrated, since the input signal is positive, the output signal from amplifier 30 is negative-going as indicated by the downwardly-extending portion 32 of FIGURE 4.

The circuit of FIGURE 3 has a feedback link, comprising a capacitance 34, that feed the output signal 32 from output terminal 31 back to the input terminal 36 of amplifier 30.

The operation of the circuit, as thus far described, is as follows. The positive input signal energizes amplifier 30 to produce a negative-going output signal; the output signal is fed back to the input in such a way as to counteract the positive tendency, in this way maintaining the potential at point 36 substantially as it was before the signal was applied to it; and assuring that the output signal from amplifier 30 remains linearly negative-going over a desired range. This circuit may be called an "operational" integrating amplifier, and its negative-going output is applied to a voltage comparator and switch energizer 38.

Voltage comparator 38 has two inputs; one of these being the output of the amplifier 30, and the other being the potential—negative in this case—of potential source 20 as applied by output switch 40. As the output from amplifier 30 becomes progressively more negative, voltage comparator 38 constantly compares it with the negative potential from source 20. When these two potentials are equal, voltage comparator 38 energizes the interconnected, or "ganged" input and output switches 26 and 40, so that they are simultaneously flipped to their alternate positions.

When this occurs, the negative potential from potential source 20 is now applied to the input summing resistance 28. Since amplifier 30 produces an output signal that is of the opposite direction compared to the input signal, the output is now positive-going as indicated by reference character 42 of FIGURE 4.

The positive-going portion 42 continues to rise until voltage comparator 38 finds that it is equal to the positive potential produced by potential source 20, as applied by the flipped output switch 40. At this instant, voltage comparator 38 flips the ganged input and output switches 26 and 40 back to their original positions; whereupon the amplifier 30 produces another negative-going portion 32a as shown in FIGURE 4.

Figure 4:
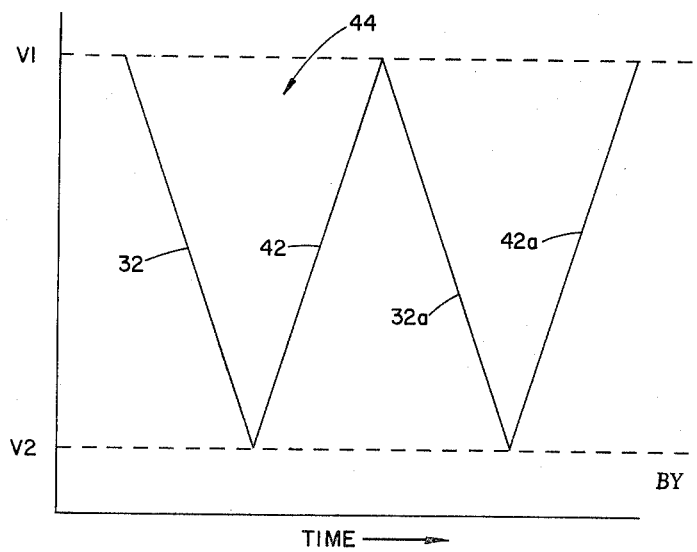
FIGURE 4 is a waveform of an output signal produced by the invention.

This cyclic flipping of the switches continues, and the output of the circuit is therefore the triangular waveform 44 of FIGURE 4; the waveform 44 varying between the amplitudes of the limiting voltages V1 and V2 provided by potential source 20. The combination thus forms a "bi-stable" device; i.e., a device that has two stable states—a "positive" one, and a "negative" one.

In accordance with the invention, the capacitance between two adjacent surfaces of the accelerometer 10 forms the feedback capacitor 34 of FIGURE 3.

Figure 5:
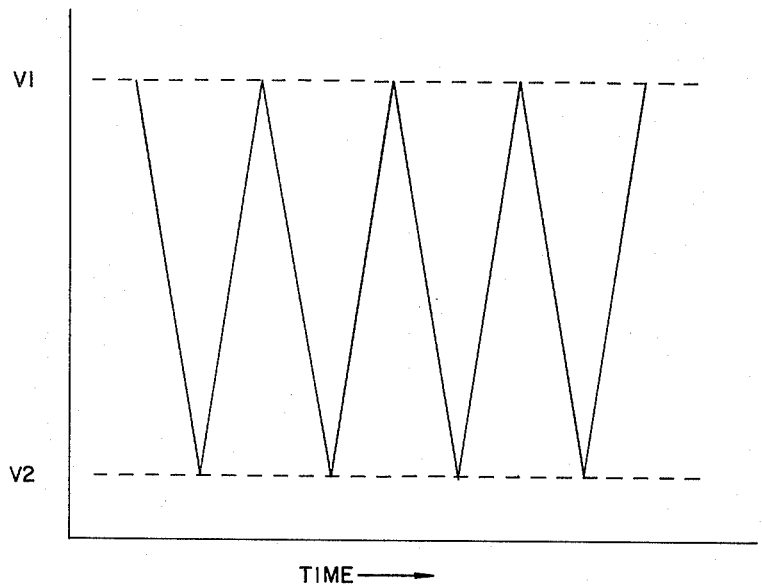
FIGURE 5 is another waveform of an output signal produced by the invention.

When acceleration occurs, the capacitance formed by the accelerometer varies as previously described, thus changing the value of feedback capacitance 34. When this capacitance becomes smaller, it affects the operation of the circuit of FIGURE 3 in such a way that the slope of the positive-going and negative-going portions 34 and 42 are changed, so that the output signal has a higher frequency, as shown by the waveform of FIGURE 5.

It may thus be seen that the variation in spacing due to acceleration is converted to a variation in capacitance; and that this variation in capacitance affects the circuit in such a way that the frequency of the output signal varies with the acceleration. It can be shown mathematically that the output frequency has an inverse relation to the change in the value of the capacitance.

Figure 6:
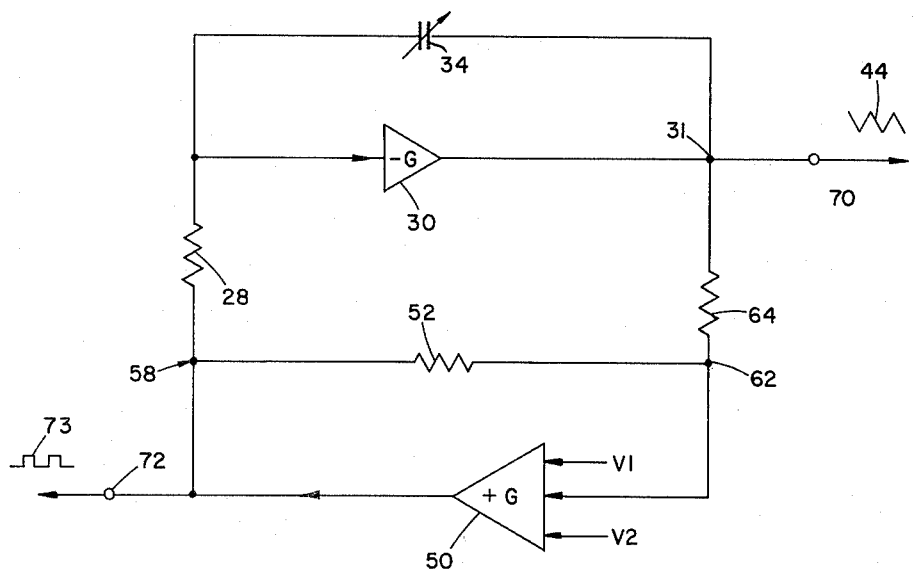
FIGURE 6 is a schematic circuit of another embodiment of the invention.

FIGURE 6 shows another embodiment of the invention; the common elements bearing identical reference characters. In FIGURE 6, an additional feedback-type amplifier 50 is used; this amplifier having the characteristic that it is also high-gain, but produces an output signal that varies in the same direction as the input signal— as indicated by +G.

The circuit of FIGURE 6 operates as follows. Assume that a positive input signal is applied to amplifier 50. It therefore produces a more-positive output signal. This larger-amplitude output traverses feed-back resistor 52, and is applied to the input of amplifier 50. The amplifier then produces an even-larger output signal, which is again fed back to the amplifier's input. This so-called "regenerative" action brings the amplifier 50 to a fully-conductive state practically instantaneously, as shown by the vertical line 54 of FIGURE 7. The amplifier 50 then tends to remain in this "positive" state, as indicated by the horizontal line 56 of FIGURE 7.

Figure 7:
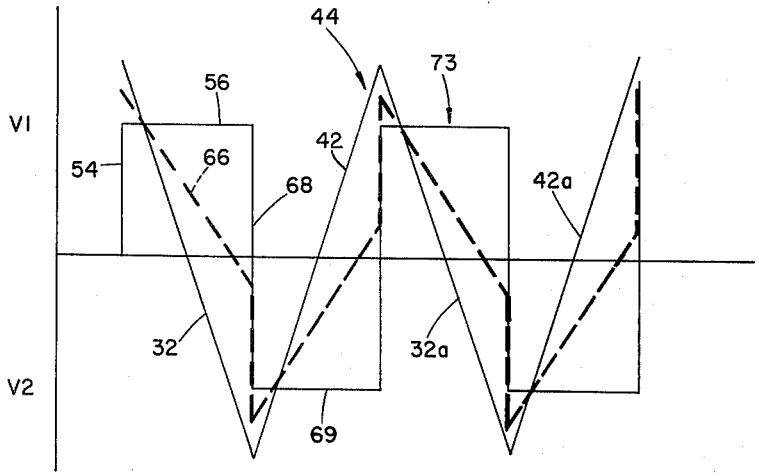
FIGURE 7 shows two waveforms produced by the embodiment of FIGURE 6.

Referring back to FIGURE 6, the positive output potential of the amplifier 50 at point 58 is applied through summing resistance 28 to amplifier 30; which therefore produces at point 31 the negative-going potential 32 of FIGURE 7.

The input of amplifier 50 "sees" at point 62 the constant positive potential 56 transmitted by feedback resistor 52 and the negative-going potential transmitted by coupling resistor 64; the actual applied potential decreasing as shown by the dotted line 66 of FIGURE 7. When this applied potential becomes slightly negative, the previously-described regenerative action causes amplifier 50 to instantaneously flip to its "negative" state as shown by the downwardly extending vertical line 68 of FIGURE 7. The input signal 66 applied to amplifier 50 also goes negative more quickly, since it is now the combination of two negative-going voltages represented by lines 32 and 68 of FIGURE 7.

At the instant that the potential at point 58 becomes negative, the output of amplifier 30 becomes positive-going, as shown by portion 42 of FIGURE 7.

This action is cyclically repeated; the output at terminal 70 being the previously described triangular waveform 44, and the output at terminal 72 being the rectangular waveform 73. These waveforms have the same frequency, as controlled by variable capacitance 34 resulting from the changed spacing produced by acceleration.

In this way the circuit of FIGURE 6 cyclically reverses itself in the same manner as the circuit previously described; the difference being that an amplifier is used to replace the switches, the comparator, and the switch energizer of the previous circuit.

It will be realized that this combination also exhibits a bi-stable characteristic.

The foregoing explanation was presented as though resistors 52 and 64 had nearly equal values. If they have different values the shape of waveform 66 would be different, thus resulting in a different quiescent frequency— which however, would still be changed by the varying capacitance of the feedback capacitor 34.

Figure 8:
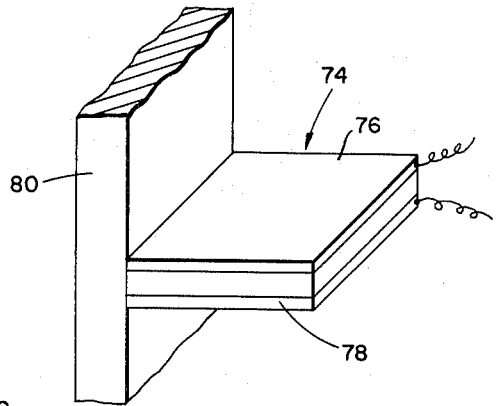
FIGURE 8 is another form of accelerometer.

If desired, the circuit of FIGURE 6 may use a fixed capacitor 34, and may use variable resistances in place of resistors 52 and/or 64. This arrangement permits the circuit to measure strain, which may—if desired—be related to acceleration as shown by the structure of FIGURE 8.

Here a silicon slab 74 has its upper and lower surfaces 76 and 78 heavily doped," so that these surfaces are strain-sensitive resistors that may be connected into the circuit of FIGURE 6 as resistors 52 and 64.

Slab 74 is supported cantilever-style from base 80, so that vertical acceleration will bend slab 74 upwards or downwards. When slab 74 is bent, one surface is compressed, while the other surface is tension-strained; so that the resistance calues of the surfaces change. If the surfaces are connected into the circuit of FIGURE 6 in such a way that their resistances form resistors 52 and 64; the changed resistance values of the surfaces affect the operation of the circuit as previously described, causing the output signal to have a changed frequency that corresponds to the strain or the acceleration.

Figure 9:
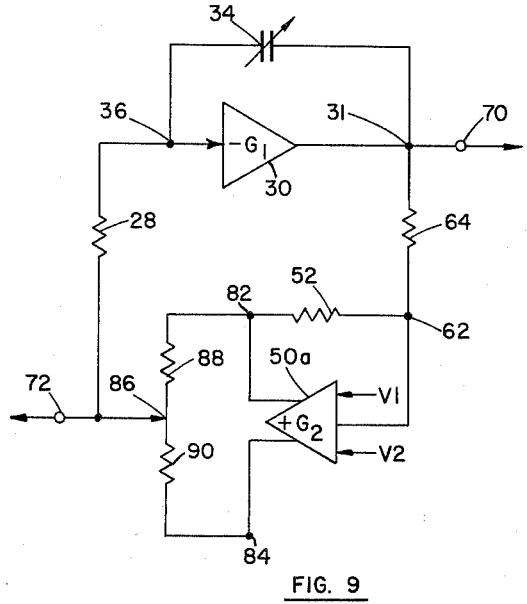
FIGURE 9 is a schematic circuit of another embodiment of the invention.

FIGURE 9 shows another embodiment of the invention. Here amplifier 50a has two oppositely-poled outputs, the potential at point 82 being equal to, but opposite that at point 84.

Amplifier 50a operates similarly to amplifier 50 as previously described, but in FIGURE 9 only a selected portion of the output is used. For example, if slider 86 were moved to its uppermost position, the circuit would operate as explained in connection with FIGURE 6; that is, the complete output at point 82 would be applied to summing resistor 28. As the slider is moved downward, a progressively smaller portion of the output signal is used; thus modifying the signal applied to amplifier 30 and the frequency of the output.

The same effect can be obtained by leaving slider 86 at the midpoint, and varying one or both of resistors 88 and 90.

This latter feature may be utilized by connecting the resistance of one or both surfaces 76, 78 of FIGURE 7 as the resistances 88, 90 of FIGURE 9. In this way, changes in acceleration vary the surface resistances, and thus the operation of the circuit of FIGURE 9. It may be seen that arrangement of FIGURE 9 also provides a bi-stable characteristic.

It will be noted that in the absence of acceleration or strain, the output signal will also have a given quiescent, "bias," frequency that depends upon circuit parameters. This bias frequency may be substracted out of any or all of the disclosed circuits by a computer, by a second signal generator, or by having a second circuit acting in a differential manner, so that only the change in frequency is used.

Although the invention has been described and illustrated in detail, it is to be understood that the same is by way of illustration and example only, and is not to be taken by way of limitation; the spirit and scope of this invention being limited only by the terms of the appended claims.

We claim:

1. In combination:
  a capacitor whose capacitance varies as a function of acceleration in a predetermined direction;
  an operational integrator, including said capacitor connected by its terminals between the output terminal and the summing junction of said integrator;
  potential source means producing two reference voltages of different potential, one of said reference voltages being connected to the input terminals of said integrator;
  voltage comparison means, connected to compare the voltage at the output terminals of said integrator with the one of said reference voltages which is not connected to the input terminals of said integrator, and adapted to switch the reference voltage connections each time the output voltage of said integrator is substantially equal to the voltage to which it is compared.

2. A signal generator comprising:
  a sensing device having a capacitive pickup;
  an operational amplifier having a capacitive feedback loop;
  means for causing said capacitive pickup to act as said feedback loop;
  a regenerative amplifier;
  means for applying the output of said operational amplifier to the input of said regenerative amplifier;
  means for applying the output of said regenerative amplifier to the input of said operational amplifier;
  a pair of reference potentials; and
  means for causing the output of said regenerative amplifier to vary between said reference potentials.

3. A signal generator comprising:
  a sensing device having a capacitive pickup;
  an operational amplifier having a capacitive feedback loop;
  means for causing said capacitive pickup to act as said feedback loop;
  a regenerative amplifier having a feedback resistor;
  means, comprising a coupling resistance, for applying the output of said operation amplifier to the input of said regenerative amplifier;
  means, comprising a summing resistance, for applying the output of said regenerative amplifier to the input of said operational amplifier;
  a pair of reference potentials; and
  means for causing the output of said regenerative amplifier to vary between said reference potentials.

4. A signal generator comprising:
  an operational amplifier having a capacitive feedback loop;
  a regenerative amplifier having a feedback resistor and a pair of oppositely-poled outputs;
  a voltage divider connected between said oppositely-poled outputs, said voltage-divider having a slider;
  means, comprising a coupling resistor, for applying the output of said operational amplifier to the input of said regenerative amplifier;
  means, comprising a summing resistor connected between said slider and the input of said operational amplifier, for applying the output of said regenerative amplifier to the input of said operational amplifier;
  a pair of reference potentials; and
  means for causing the output of said regenerative amplifier to vary between said reference potentials.

5. A signal generator comprising:
  an operational amplifier;
  a second amplifier;
  means for applying a signal to the input of said second amplifier, said signal-applying means comprising a coupling resistance connected between the output of said operational amplifier and the input of said second amplifier, said means further comprising a feedback resistor connected between the ouput and input of said second amplifier;
  a summing resistance connected between the output of said second amplifier and the input of said operational amplifier;
  a sensing device having a variable resistance; and
  means for connecting said variable resistance as one of the resistors comprising said signal-applying means.

6. A signal generator comprising:
  an operational amplifier;
  a second amplifier;
  means for applying a signal to the input of said second amplifier, said signal-applying means comprising a coupling resistance connected between the output of said operational amplifier and the input of said second amplifier, and further comprising a feedback resistor connected between the output and input of said second amplifier;
  a summing resistance connected between the output of said second amplifier and the input of said operational amplifier;
  a sensing device having a pair of variable resistances; and
  means for connecting said variable resistances as the resistors comprising said signal-applying means.

7. A signal generator comprising:
  a pair of reference potentials;
  an operational amplifier having a capacitive feedback;
  a sensing device having a capacitive pickup;
  means for causing said capacitive pickup to act as said capacitive feedback;
  first switch means for applying one of said reference potentials to said amplifier;
  means for comparing the output of said amplifier with said other reference potential, said comparing means comprising second switch means;
  means for ganging said switch means; and
  means for flipping both said ganged switch means when the output of said amplifier equals said other reference potential.

8. A signal generator comprising:
  a pair of reference potentials;
  an operational amplifier having a capacitive feedback;
  a sensing device having a capacitive pickup;
  means for causing said capacitive pickup to act as said capacitive feedback;
  first switch means for applying one of said reference potentials to said amplifier;
  means for comparing the output of said operational amplifier with said other reference potential, said comparing means comprising second switch means ganged with said first switch means;
  voltage comparator means for comparing the output of said operational amplifier with said other reference potential; and
  switch energizing means for flipping said ganged switch means to their other positions when said output equals said other reference potential.

9. A device as recited in claim 1 and further comprising:
  a double-pole-double-throw switch, connected in a first throw position to connect said first reference voltage to the input terminals of said integrator and to connect said second reference voltage to said voltage comparison means, and connected in a second throw position to connect said second reference voltage to the input terminals of said integrator and to connect said first reference voltage to said voltage comparison means; and a switch energizer responsive to said voltage comparison means, and adapted to throw said switch when the voltage compared by said comparison means substantially coincides.

10. A device as recited in claim 9 in which said reference voltages are substantially equal in magnitude and are opposite in polarity.

11. A device as recited in claim 1 in which said reference voltages are substantially equal in magnitude and are opposite in polarity.

12. In combination:
an operational integrator, including a first series connected resistor between its input terminals and its summing junction, and including a capacitor connected between its output terminal and its summing junction;

a summing amplifier, including a second series connected resistor between its input terminals and its summing junction, and including a third resistor connected between its output terminals and its summing junction;

the output terminals of said summing amplifier being connected to the input terminals of said integrator, and the output terminals of said integrator being connected to the input terminals of said summing amplifier.

13. A device as recited in claim 12 and further comprising:
means for producing a first and second reference voltage of substantially equal magnitude and opposite polarity, said reference voltages being connected to said summing amplifier to limit the output voltage of said summing amplifier substantially to the magnitude said reference voltages.

14. A device as recited in claim 13 in which the capacitance of said capacitor is adapted to vary as a function of acceleration in a predetermined direction.

15. A device as recited in claim 14 in which the resistances of said second and third resistors are adapted to vary as a function of acceleration in a predetermined direction.

References Cited by the Examiner

UNITED STATES PATENTS

| | | | |
|---|---|---|---|
| 2,697,594 | 12/1954 | Stanton | 318—31 X |
| 2,899,190 | 8/1959 | Driver | 73—517 |
| 2,908,166 | 10/1959 | Johnson | 324—61 |
| 2,917,300 | 12/1959 | Spiess | 73—517 |
| 2,980,866 | 4/1961 | Naines | 328—181 |
| 3,025,000 | 3/1962 | Taback | 235—197 |

RICHARD C. QUEISSER, *Primary Examiner.*

JOSEPH P. STRIZAK, JAMES J. GILL,
*Primary Examiners.*